(12) United States Patent
Srikantan et al.

(10) Patent No.: US 12,166,827 B1
(45) Date of Patent: Dec. 10, 2024

(54) NETWORK CONNECTION ACTIVATION/DEACTIVATION PLATFORM

(71) Applicant: AT&T Intellectual Property I, L.P., Atlanta, GA (US)

(72) Inventors: Sekhar Srikantan, Flemington, NJ (US); Nagaraju Sheela, Rockford, IL (US); Connie Anderson, Hillsborough, NJ (US); Ali Nikain, Atlanta, GA (US); Ivetta Pogosova, Plainsboro, NJ (US); Kevin Le, Jackson, NJ (US); Tamir Merhav, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/341,885

(22) Filed: Jun. 27, 2023

(51) Int. Cl.
*H04L 67/141* (2022.01)
*H04L 12/46* (2006.01)

(52) U.S. Cl.
CPC ........ *H04L 67/141* (2013.01); *H04L 12/4641* (2013.01)

(58) Field of Classification Search
CPC .......................... H04L 67/141; H04L 12/4641
See application file for complete search history.

(56) References Cited

U.S. PATENT DOCUMENTS

| | | | |
|---|---|---|---|
| 11,218,424 B1* | 1/2022 | Hanahan | H04L 47/827 |
| 11,425,054 B1* | 8/2022 | Dunsmore | H04L 47/828 |
| 11,588,731 B1* | 2/2023 | Teng | H04L 61/2514 |
| 11,765,244 B1* | 9/2023 | Barclay | H04L 67/51 |
| | | | 709/226 |
| 11,777,899 B1* | 10/2023 | Durrani | H04L 61/5046 |
| | | | 709/245 |
| 11,936,518 B2* | 3/2024 | Kumar | H04L 67/10 |
| 2015/0280980 A1* | 10/2015 | Bitar | H04L 67/10 |
| | | | 709/226 |

(Continued)

OTHER PUBLICATIONS

"AT&T Creates Easy, Highly Secure Connections Between Business Ecosystems", AT&T Dynamic Exchange• to empower businesses through interconnectivity, https://www.business.att.com/business-solutions/att-dynamic-exchange.html, Oct. 6, 2021, 2 pp.

(Continued)

*Primary Examiner* — Blake J Rubin
(74) *Attorney, Agent, or Firm* — Guntin & Gust, PLC; Miyoung Shin

(57) ABSTRACT

Aspects of the subject disclosure may include, for example, connecting a plurality of subscriber networks via switched, shared, or dedicated Ethernet connections using a wired network, where the plurality of subscriber networks includes a first network and a second network, providing a provisioning and activation application that enables a user to selectively activate or deactivate a connection to one or more of the plurality of subscriber networks or a cloud service provider, as a first orderable item, and select a plurality of network configuration attributes, as a second orderable item, and based on a request for the connection to the one or more of the plurality of subscriber networks or the cloud service provider, activating the connection that follows the selected plurality of network configuration attributes. Other embodiments are disclosed.

20 Claims, 7 Drawing Sheets

(56) References Cited

U.S. PATENT DOCUMENTS

2016/0127454 A1* 5/2016 Maheshwari ......... G06F 9/5072
709/223
2016/0308762 A1* 10/2016 Teng ................... H04L 12/4633
2018/0034664 A1* 2/2018 Mulligan ................ H04L 67/10

OTHER PUBLICATIONS

"AT&T Dynamic Exchange", Your Connection to the Cloud, AT&T Business, https://www.business.att.com/content/dam/attbusiness/briefs/att-dynamic-exchange-brochure.pdf (accessed Jun. 23, 2024), 1 p.

* cited by examiner

NETWORK CONNECTION ACTIVATION/DEACTIVATION PLATFORM

FIELD OF THE DISCLOSURE

The subject disclosure relates to a platform for selectively activating or deactivating connections to a cloud service provider or subscriber networks connected via switched, shared or dedicated Ethernet connections.

BACKGROUND

Network connectivity solutions involving different entities, different service providers, different network protocols, etc. have been implemented with complex, inefficient and manual intensive workflow processes. Multiple work centers of a service provider may compete to address requests for a large number of different network connection requests.

Conventional networking solutions may treat various participating locations or sites that belong to the same enterprise or business entity equally and restrict connectivity to internal resources.

BRIEF DESCRIPTION OF THE DRAWINGS

Reference will now be made to the accompanying drawings, which are not necessarily drawn to scale, and wherein.

DETAILED DESCRIPTION

Figure 1:
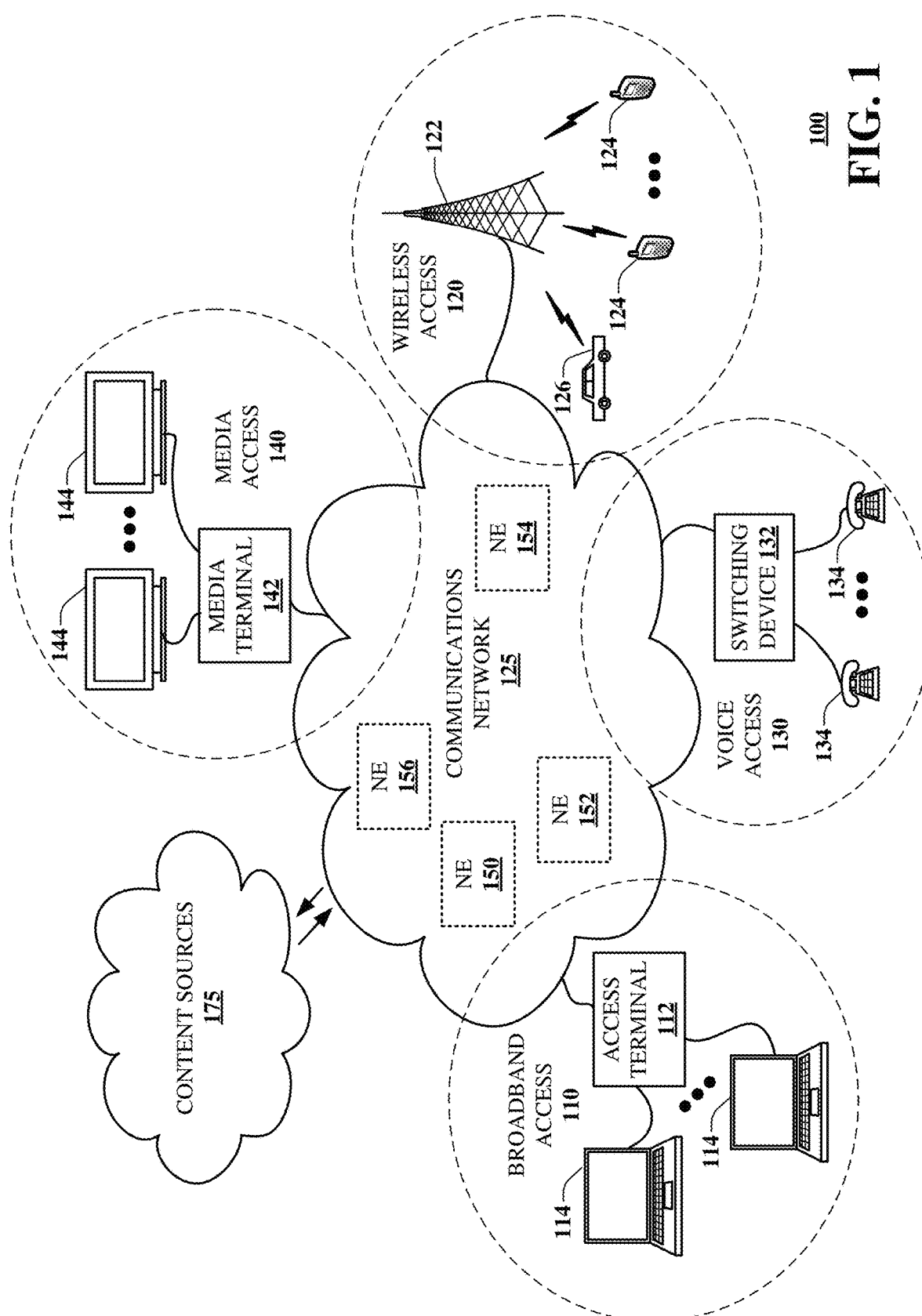
FIG. 1 is a block diagram illustrating an exemplary, non-limiting embodiment of a communications network in accordance with various aspects described herein.

The subject disclosure describes, among other things, illustrative embodiments for providing a platform which enables users to selectively activate or deactivate network connections to a cloud service provider or subscriber networks connected via Ethernet connections using a wired system. The platform may facilitate activation, deactivation, and modification of network connections requests on an on-demand basis and near real-time. The platform may further facilitate users' selection of network connection attributes in an orderable form. Other embodiments are described in the subject disclosure.

One or more aspects of the subject disclosure are directed to a non-transitory machine-readable medium, including executable instructions that, when executed by a processing system including a processor, facilitate performance of operations. The operations include connecting a plurality of subscriber networks via switched, shared or dedicated Ethernet connections using a wired system, where the plurality of subscriber networks includes a first subscriber network and a second subscriber network, connecting a first device to a first subscriber network via a virtual local area network (VLAN), and connecting a second device to a second subscriber network via the VLAN. The operations further include, upon authorization from the first device or the second device, executing a workflow embedded provisioning application that enables the first device or the second device to selectively activate or deactivate a connection to one or more of the plurality of subscriber networks or a cloud service provider, where the workflow embedded provisioning platform further enables the first device or the second device to select a plurality of network configuration attributes as an orderable item, and in response to a first activation request, enabling a connection between the first subscriber network and the second subscriber network that follows the selected plurality of network configuration attributes via a virtual private network (VPN) over a common backbone network.

One or more aspects of the subject disclosure are directed to a device which includes a processing system including a processor and a memory that stores executable instructions that, when executed by the processing system, facilitate performance of operations. The operations include connecting a plurality of subscriber networks via switched, shared or dedicated Ethernet connections using a wired network, where the plurality of subscriber networks includes a first network and a second network, executing a provisioning and activation application that enables a user to selectively activate or deactivate a connection to one or more of the plurality of subscriber networks or a cloud service provider, as a first orderable item, and select a plurality of network configuration attributes, as a second orderable item. The operations further include, based on a request for the connection to the one or more of the plurality of subscriber networks or the cloud service provider, activating the connection that follows the selected plurality of network configuration attributes.

One or more aspects of the subject disclosure are directed to a method including connecting, a processing system including a processor, a plurality of subscriber networks via switched, shared, or dedicated Ethernet connections using a wired network, where the plurality of subscriber networks includes a first network and a second network, providing, by the processing system, an on-demand application that enables a user to selectively activate or deactivate a network connection, among one or more of the plurality of subscriber networks, or, to a cloud service provider, receiving, by the processing system, a request for activating the network connection, classifying, by the processing system, the request as a host connection request or a client connection request, where the host connection request provides the same service to multiple clients, and where the client connection request provides access to multiple hosts and host sites, assigning, by the processing system, a unique host identifier on an interconnecting virtual private network routing instance, prompting, by the processing system, a plurality of network configuration attributes for selection by the user as an orderable item to the user, and based on the request for activating the network connection, activating, by the processing system, the connection that follows the selected plurality of network configuration attributes.

Referring now to FIG. 1, a block diagram is shown illustrating an exemplary, non-limiting embodiment of a communication system 100 in accordance with various aspects described herein. For example, at least a part of the system 100 (e.g., a broadband access 110, communications network elements 150, 152) can facilitate in whole or in part a platform for enabling users to selectively activate or deactivate network connections to a cloud service provider or subscriber networks connected via a switched, shared, or dedicated Ethernet. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network.

In various embodiments, the switching device 132 can include a private branch exchange or central office switch, a media services gateway, VOIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2:
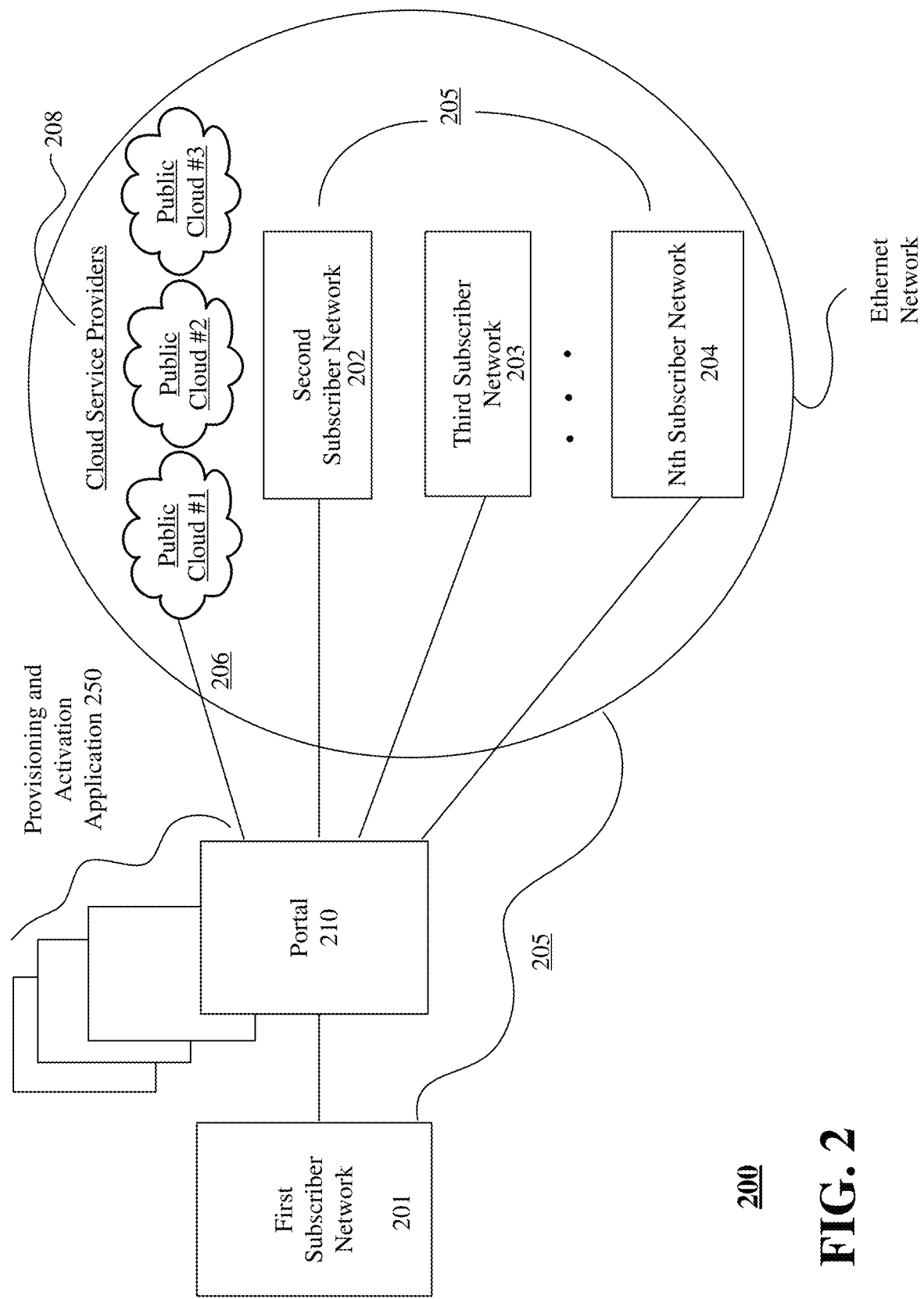
FIG. 2 is a block diagram illustrating an exemplary, non-limiting embodiment of a network connection activation/deactivation platform in accordance with various aspects described herein.

FIG. 2 is a block diagram illustrating an example, non-limiting embodiment of a network connection activation/deactivation platform 200 for enabling users to selectively activate or deactivate network connections to a cloud service provider or subscriber networks connected via switched, shared or dedicated Ethernet connections functioning within the communication network of FIG. 1 in accordance with various aspects described herein. The network connection activation/deactivation platform 200 facilitates network connections 205 among a plurality of subscriber networks having a first subscriber network 201, a second subscriber network 202, and a Nth subscriber network 204. The platform 200 further facilitates network connections 206 to one or more cloud service providers 208. FIG. 2 depicts Public Cloud 1, Public Cloud 2 and Public Cloud 3 by way of example only.

Figure 3:
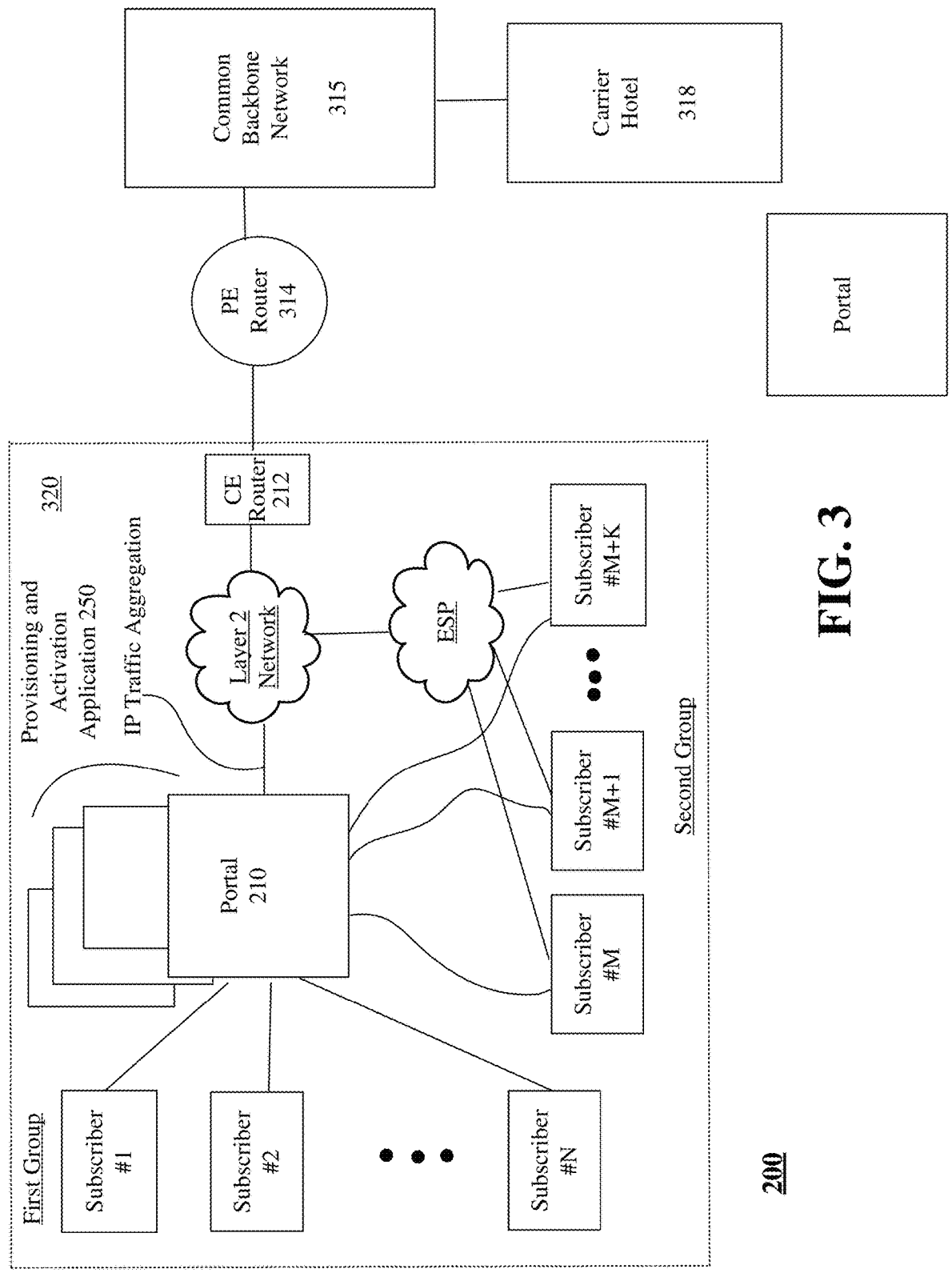
FIG. 3 illustrates a block diagram of subscriber networks connected with an Ethernet network in accordance with various aspects described herein.

In various embodiments, the plurality of subscriber networks 201, 202, 203, 204 are connected to Ethernet connections provided and operated by a service provider. In some embodiments, the Ethernet connections can be switched, shared, or dedicated. The plurality of subscriber networks 201, 202, 203 and 204 have connections to a provider edge of the service provider, as shown in FIG. 3. In some embodiments, the service provider may be a local exchange carrier (LEC) that provides telecommunication services within designated areas. The service provider has access to connection points of the plurality of subscriber networks 201, 202, 203 and 204 based on wired systems which are extended to premises of the plurality of subscriber networks.

Additionally, the plurality of subscriber networks 201, 202, 203, 204 may communicate using a virtual private network (VPN) within their own networks. For instance, the first subscriber network 201 may have multiple sites geographically distributed which communicate and exchange data via the VPN. Multiple sites that belong to the same enterprise may communicate via the virtual private network (VPN) to facilitate secure communications and exchange data within the same enterprise.

In various embodiments, the first subscriber network 201 is connected to a portal 210. In some embodiments, the portal 210 is at least a part of a provisioning and activation application that provides users with access to various network connection options. The network connection activation/deactivation platform 200 can be implemented with a stack of applications which facilitate a set of nested workflows. As depicted in FIG. 2, the second subscriber network 202 is also connected to the portal 210. In some situations, subscriber entities operating the plurality of subscriber networks 201, 202, 203 and 204 may be customers, users, business partners, clients, etc. and need to communicate and exchange data in order to perform tasks together. In various embodiments, access to the portal 210 can be a part of extended services to the connection services based on the Ethernet connections. In other words, the service provider may offer the extended services to existing subscriber networks which have access to the Ethernet connections. In some embodiments, the first subscriber network 201 and the second subscriber network 202 have signed up for the extended services and can access the portal 210. Upon authorization by the first and the second subscriber networks, the first subscriber network 201 and the second subscriber network 202 can request, via the portal 210, connections and exchange data with other subscriber networks or the cloud service providers 208 as needed, on an on-demand basis. The connection via the portal 210 is secure and protected by using the VPN.

Although different enterprises or companies may not share data and access to the networks may be restricted to internal devices, it is convenient and time and cost effective for the different enterprises to selectively enable or disable connections based on predetermined and mutually agreed terms and conditions. Additionally, the first subscriber and the second subscriber may be enabled to selectively activate or deactivate, or modify particular network connections as needed, via the portal 210. In other words, the portal 210 can provide the functionality of a self-service, on-demand entry points for the subscribers to request connections to other subscriber networks. In some embodiments, the portal 210 may serve as an entry point for subscribers to "order" the network connections as an orderable item. In addition, the order of the network connections is modifiable.

In various embodiments, the portal 210 is used to coordinate connections to one or more cloud service providers. Cloud services provide powerful computing resources and services that enterprises can use such computing resources as needed without having to purchase and maintain hardware and software resources. Due to scalability and convenience, enterprises have constant needs to use cloud services and such enterprises can selectively enable or disable connections to cloud services via the portal 210. The portal 210 can provide the functionality of a self-service, on-demand entry points for the subscribers to request connections to the cloud services.

Figure 4:
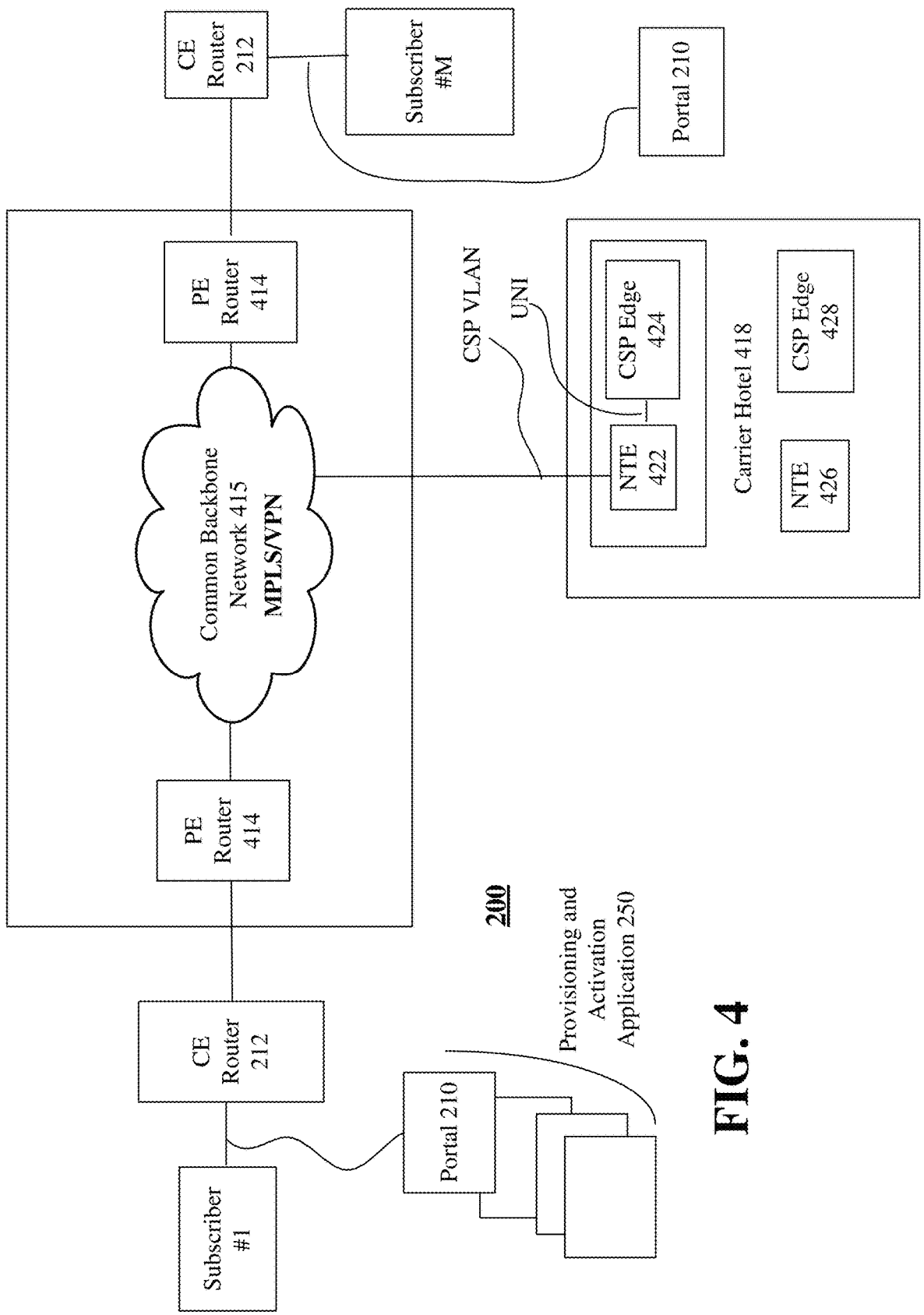
FIG. 4 illustrates a block diagram of a common backbone network in accordance with various aspects described herein.

As described above, in some embodiments, the provisioning and activation application 250 can implement the portal 210 as depicted in FIGS. 2 through 4. The provisioning and activation application 250 further enables the first subscriber, the second subscriber or both to select a plurality of network configuration attributes as another orderable item.

FIG. 3 illustrates a block diagram of subscriber networks 320 connected via Ethernet connections in accordance with various aspects described herein. The subscriber networks 320 include a plurality of subscriber entities such as large enterprises, small business, individuals, etc. In various embodiments, the subscriber entities operate their own networks which serve multiple sites at different geographical or network locations. Multiple sites that belong to the same enterprise may communicate via the virtual private network (VPN) to facilitate secure communications and exchange data within the same enterprise.

In various embodiments, a service provider provides switched, shared or dedicated Ethernet connections to the subscriber entities. In some embodiments, as discussed above, the service provider is a LEC that provides telecommunication services to the subscriber entities. Accordingly, the service provider operates telecommunication networks and wired systems that deliver telecommunication services to the subscriber entities. For instance, the service provider can provide the last mile access such that a portion of the telecommunications network chain may physically reach the subscriber entities' premises.

In various embodiments, the subscriber entities can be divided into a first group and a second group, as depicted in FIG. 3. The first group includes Subscriber entities No. 1 through No. N. For the first group, the service provider serves as an incumbent LEC and has direct access to the first group of subscriber entities. For the second group of Subscriber entities, the service provider may have access via an External Service Provider (ESP). For the subscriber entities of the first group, the service provider can aggregate IP traffic of the subscriber entities. Regardless of whether the service provider has the direct access or not, both the first group and the second group of subscriber entities have access to a Layer 2 network provided and operated by the service provider, as depicted in FIG. 3.

In various embodiments, the telecommunication network based on the wired systems corresponds to a data link layer according to Layer 2 in the Open Systems Interconnection (OSI) model. The data link layer is the protocol layer that transfers data between adjacent network nodes in a wide area network (WAN) or between nodes on the same local area network (LAN). The data link layer is to ensure a reliable transmission and control access to the transmission medium. The data link layer handles local delivery of frames between devices on the same LAN and data link frames do not cross the boundaries of a local network. Thus, inter-network routing and global addressing such as packet delivery based on IP addresses are handled by higher layers in the OSI model than the data link layer. The data link layer mainly handles local delivery and local addressing.

Regardless of whether the subscriber entities are the first group or the second group, the subscriber entities have access to the Layer 2 network provided by the service provider. In some embodiments, the subscriber entities are connected to a LAN or a virtual LAN (VLAN). In some embodiments, the service provider can access connection nodes in the LAN or VLAN with identifications and establish network configurations of the connection nodes such as ports assignment, bandwidth setup, etc. The service provider can activate, deactivate or modify connections between particular connection nodes. Additionally, the service provider can access one or more cloud service providers via a common VPN. As depicted in FIG. 3, the subscriber networks 320 communicate through a common backbone network 315 of the service provider via a set of routers 212 and 314. FIG. 3 illustrates the routers 212 and 314 for convenience of descriptions, but the present disclosure is not limited thereto.

FIG. 4 illustrates a block diagram of the common backbone network 415 in accordance with various aspects described herein. In various embodiments, a large number of entities are subscribed to the telecommunication services by the service provider and such subscriber entities are connected via their virtual local area networks (VLANs) to exchange data among multiple sites distributed at different geographical or network locations. The Layer 2 network such as VLANs can be extended across the multiple sites on the same broadcast domain by using the VPN. The VPN is a network shared between organizations and each VPN has a respective policy of addressing, routing and security. The service provider ensures that traffic belonging to different subscriber entities is isolated and the respective policy is respected. The service provider manages the VPN, and contracts, such as a service agreement, are used to specify terms relating to network availability, transmission rates between sites, and other transmission details in connection with the VPN.

In some embodiments, the VPN connection may be implemented with a route-based IPSec tunnel between the multiple sites and data travelling over the VPN may not be visible to a physical network surrounding the VPN, thereby enabling the secure communications. In other embodiments, the Multi-Protocol Label Switching (MPLS) technique can be used to direct and carry data between network nodes over the common backbone network 415 of the service provider. The MPLS technique uses labels to route packets, instead of using IP addresses, and can be independent of protocol and data.

In various embodiments, different types of the VPN may be used in the network connection activation/deactivation platform 200, including Layer 2 VPNs that use MPLS labels to transport data. Layer 2 VPNs may be used to facilitate the Layer 2 network. Layer 2 VPNs include Virtual Private LAN Switching Service (VPLS) which is an end-to-end service such as an Ethernet multipoint service. The VPLS is the LAN service because a multipoint connectivity among participant endpoints is provided like a LAN.

In other embodiments, Layer 3 MPLS VPNs may be used to transport data. When Layer 2 VPNs are used, service provider systems forward subscriber data packets based on Layer 2 information. Layer 3 MPLS VPNs are referred to as a Border Gateway Protocol (BGP)-VPN because a multi-protocol BGP is used to transport the traffic. The communication occurs between routers including Provider Edge routers (PEs), which sit on the edge of the service provider's network, as shown in FIG. 4 (e.g., the PE router 414). The PE router 414 manages tables for storing routing information. VPN routing and forwarding instances (VRF) table includes subscriber VPN routes associated with one or more directly connected sites (i.e., CE routers).

In various embodiments, the VRF table is associated with logical or physical interfaces which can share the same routing information. When a route is defined for a particular VPN site, the corresponding VRF is informed based on routing context associated with an incoming interface. The routing context manages several instances of a particular routing protocol, but routing information between the contexts is separated. A routing distinguisher is added to the beginning of an IPV4 route before the route is distributed in the BGP and used for exchanging VPN routes between the PE routers such as the PE routers 414. Dynamic routing protocols are used to exchange routing information for the Layer 3 VPN. Routes are imported into VRFs, and the PE router 414 can transmit the routes to the relevant VPN sites, providing the routing information that ensures connectivity between the VPN sites.

In various embodiments, the network connections activation/deactivation platform 200 according to the present disclosure enables an interconnect of Layer 2 and Layer 3 connections substantially seamlessly by generating a new service instance or a VPN/VRF. Additionally, access to multiple sites of a given customer (i.e., the multiple sites that belong to the same enterprise) to a cloud service provider can be enabled using multiple subnets in order to provide efficient routing and eliminating latency issues.

In various embodiments, the subscriber networks can be connected and communicate with one or more cloud service providers via the VLAN. For instance, the subscriber #1 may be connected to a carrier hotel 418 via the VLAN. At the carrier hotel 418, all of major cloud service providers are present to provide their presence for Tier-1 customers in order to co-locate access devices for high capacity/bandwidth connectivity in a secure facility with temperature control and backup power to ensure high availability.

In various embodiments, the subscriber #1 may select a desired cloud service provider among cloud service providers present at the carrier hotel 418 and communicate with the desired cloud service provider.

As depicted in FIG. 4, a network termination equipment (NTE) 426 is present at the carrier hotel 418. The NTE 426 connects the cloud service provider's equipment or data to the service provider's equipment or network that comes into the carrier hotel 418. In some embodiments, the NTE 422 is connected to a cloud service provider edge 424 via a user network interface (UNI) in the carrier hotel 418. In some embodiments, the user network interface (UNI) is a demarcation point where the public switched telephone network of the service provider ends.

Figure 5:
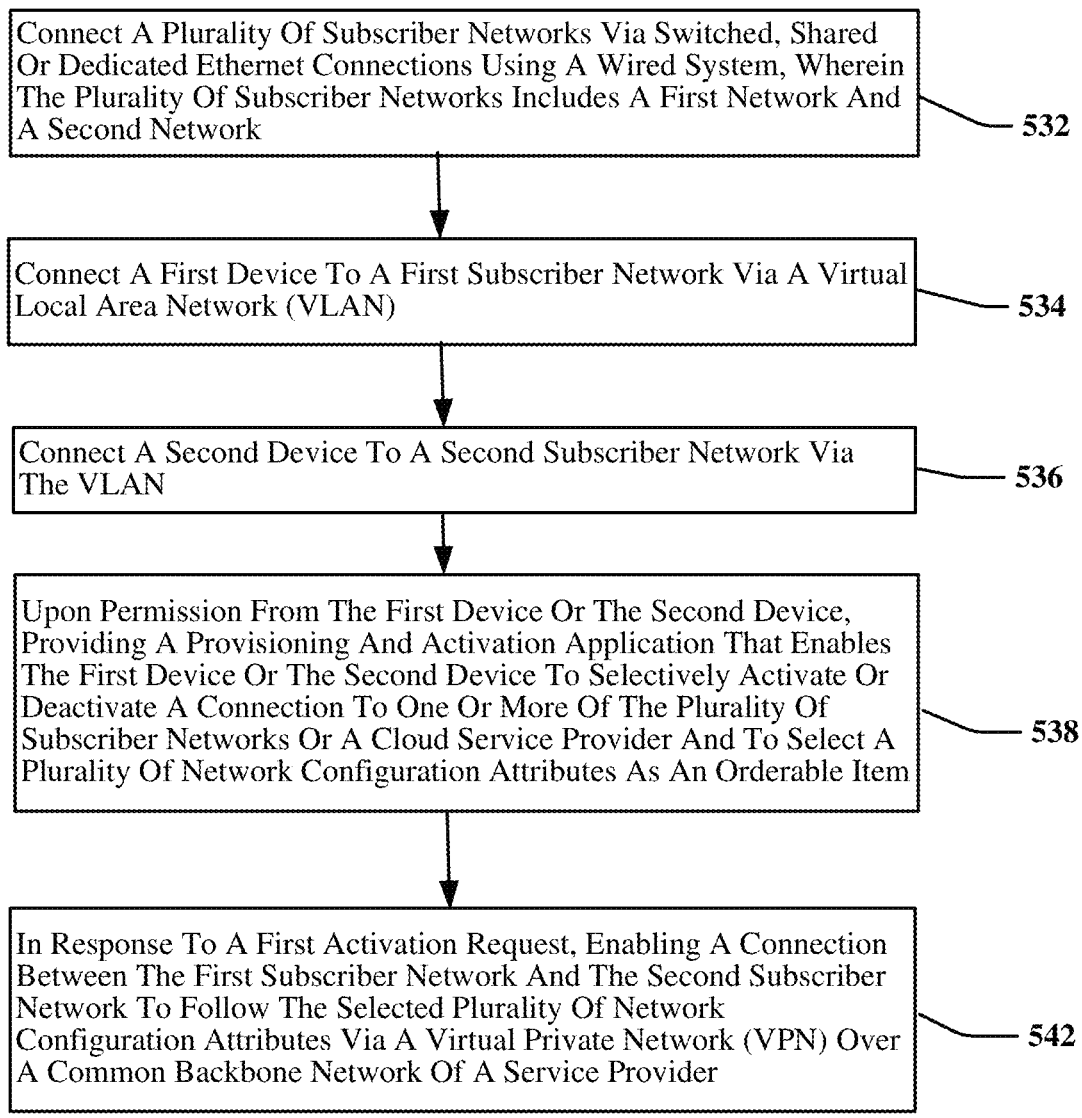
FIG. 5 depicts an illustrative embodiment of a method in accordance with various aspects described herein.

FIG. 5 depicts an illustrative embodiment of a method in accordance with various aspects described herein. In various embodiments, a plurality of subscribers are subscribed to telecommunication services provided by a service provider (at 532). In some embodiments, the telecommunication services include telephone services and the service provider can be a local exchange carrier (LEC). The telecommunication services may be based on wired systems such as the switched, shared or dedicated Ethernet network. A first subscriber and a second subscriber among the plurality of subscribers operate a first subscriber network and a second subscriber network, respectively. In the first network, a plurality of devices including a first device is connected via a VLAN and exchanges data in the first subscriber network (at 534). In the second subscriber network, a plurality of devices including a second device is connected via a VLAN and exchanges data (at 536). Data traffic that belongs to the first subscriber network or the second subscriber network is exchanged among multiple sites via a VPN such that secure communications are enabled over a public network (at 538 and 542). More specifically, upon authorization from the first device or the second device, a provisioning and activation application (e.g., 250 depicted in FIG. 2) is provided which enables the first device or the second device to selectively activate or deactivate a connection to one or more of the plurality of subscriber networks or a cloud service provider is provided (at 538). The provisioning and activation application further enables the first device or the second device to select a plurality of network configuration attributes as an orderable item (at 538).

In response to a first activation request, a connection between the first subscriber network and the second subscriber network to follow the selected plurality of network configuration attributes is enabled via a virtual private network (VPN) over a common backbone network of a service provider (at 542). In this process, the first device and the second device initiate a handshake process to identify each device and/or each network and authenticate the connection request. In some embodiment, the provisioning and activation application facilitates this process to prompt relevant information and notifications to the first device and the second device.

In various embodiments, the first subscriber network and the second subscriber network have access to a provider edge router based on the subscription of services provided by the service provider (at 542). In some embodiments, the first subscriber network and the second subscriber network have a respective customer edge router that is in communication with the provider edge router.

In various embodiments, the first device sends a connection request as a host or a client and may not be limited to one of the host and the client. The connections are tagged as 'Host' or 'Client' based on a preference. Host connections provide the same service to multiple clients. Client connections have the ability to access multiple hosts and host sites.

Figure 6:
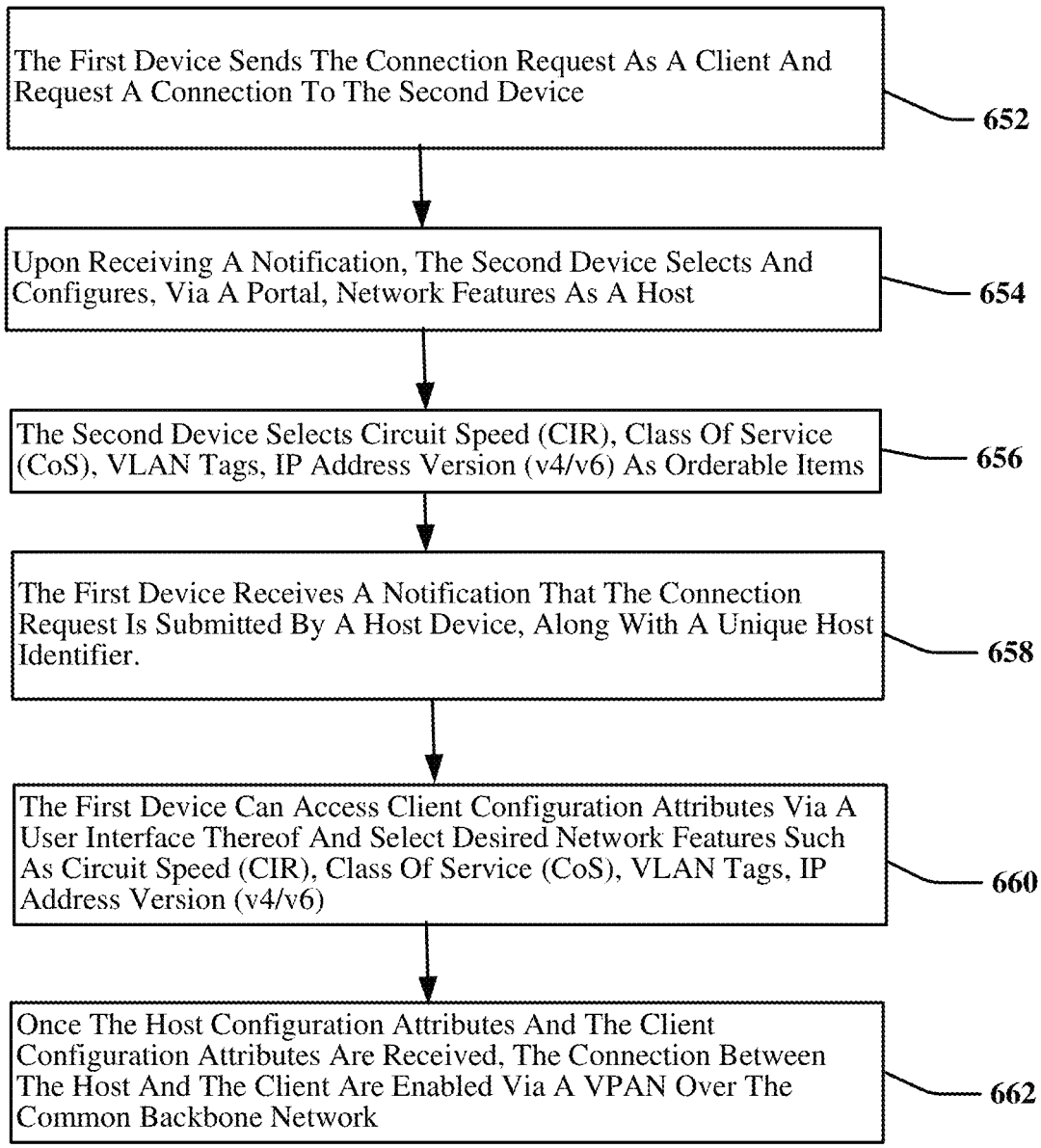
FIG. 6 depicts an illustrative embodiment of another method in accordance with various aspects described herein.

FIG. 6 depicts an illustrative embodiment of another method 600 in accordance with various aspects described herein. In particular, FIG. 6 further illustrates the processes 538 and 542 of FIG. 5. In some embodiment, the first device sends the connection request as a client and requests a connection to the second network (at 652).

In various embodiments, the second device of the second subscriber network receives a notification for the connection request. In order to enable the connection with the first device of the first network, the second device selects and configures, via the portal 210, network features as a plurality of network configuration attributes (at 654). In the request connection, the second device operates as a host and can select host connection configuration attributes among the plurality of network configuration attributes. For instance, the second device can select the network features such as Circuit Speed (CIR), Class of Service (CoS), VLAN Tags, IP address version (v4/v6) regarding a particular connection (at 656). In some embodiments, the portal 210 (FIGS. 2-4) prompts different network features, e.g., in the form of webpages, on an interface of the second device and permits the second device to select the network features. The network features such as Circuit Speed (CIR), Class of Service (CoS), VLAN Tags, IP address version (v4/v6) are orderable and modifiable by the second device (at 656). In some embodiments, the second device can set a valid time duration to the connection with the first device and selectively activate and deactivate the connection accordingly. The second device can perform activation and/or deactivation by accessing the portal 210 as needed. The portal 210 may facilitate on-demand based connections between businesses (e.g., the first subscriber, the second subscriber, etc.) and between businesses and cloud service providers.

Once the host connection configuration attributes are entered and submitted from the second device, the first device receives a notification that the connection request is submitted by a host device (i.e., the second device), along with a unique host identifier (at 658). The first device sends a confirmation for the connection request to the portal 210. Subsequently, the first device can access client configuration attributes via a user interface thereof and select desired network features such as Circuit Speed (CIR), Class of Service (CoS), VLAN Tags, IP address version (v4/v6) (at 660). By way of example, webpages or other user interface forms are prompted to the user interface of the first device to display various network features and the first device can make a selection of these various network features. Additionally, or alternatively, the first device may be presented with pricing information for selecting these various network features.

In various embodiments, once the host configuration attributes and the client configuration attributes are received by the service provider via the portal 210, the connection between the first device of the first subscriber network and the second device of the second subscriber network is enabled and the first device and the second device are connected via a VPN over the common backbone network of the service provider (at 662). Data exchanged between the first device and the second device will be secure and protected via the VPN.

In various embodiments, the network connection activation/deactivation platform 200, including the portal 210, implements a robust, scalable and flexible design by defining entry points or end points that support different Layer 2 and Layer 3 provisioning requests from external ordering platforms. Users of the subscriber networks can order network features to suit their needs. For instance, network features such as Circuit Speed (CIR), Class of Service CoS, VLAN Tags, and IP address version (v4/v6) are orderable and modifiable on-demand by using the platform 200, for instance, via the portal 210. Additionally, one or more circuits can be configured with packet filtering attributes, and the packet filtering attributes are specifically generated and unique and correspond to a community value string of a router configuration as a combination of a VRF instance and the unique host identifier.

In various embodiments, a workflow engine may be used to throttle pre-processing functions like order validation, bandwidth checks, and object creation of a VPN, site, a customer record and premise, etc. By way of example only, the implementation of the network services activation/deactivation platform 200 utilizes a workflow embedded open-source based microservice. This microservice invokes the existing Business Process Execution Language (BPEL) workflow for extensive reuse of well-established Design & Assign and activation flows. The BPEL workflow layer allows users to define a workflow for handling different transactions. This workflow-within-workflow may make a data model compatible between standard products and enhanced Host-Client modeled products. Additionally, a set of nested workflows coordinate orchestration of circuit designs and activations and enable a selected set of a plurality of subscribers and a selected set of sites to be configured for access to one or more cloud service providers.

Figure 7:
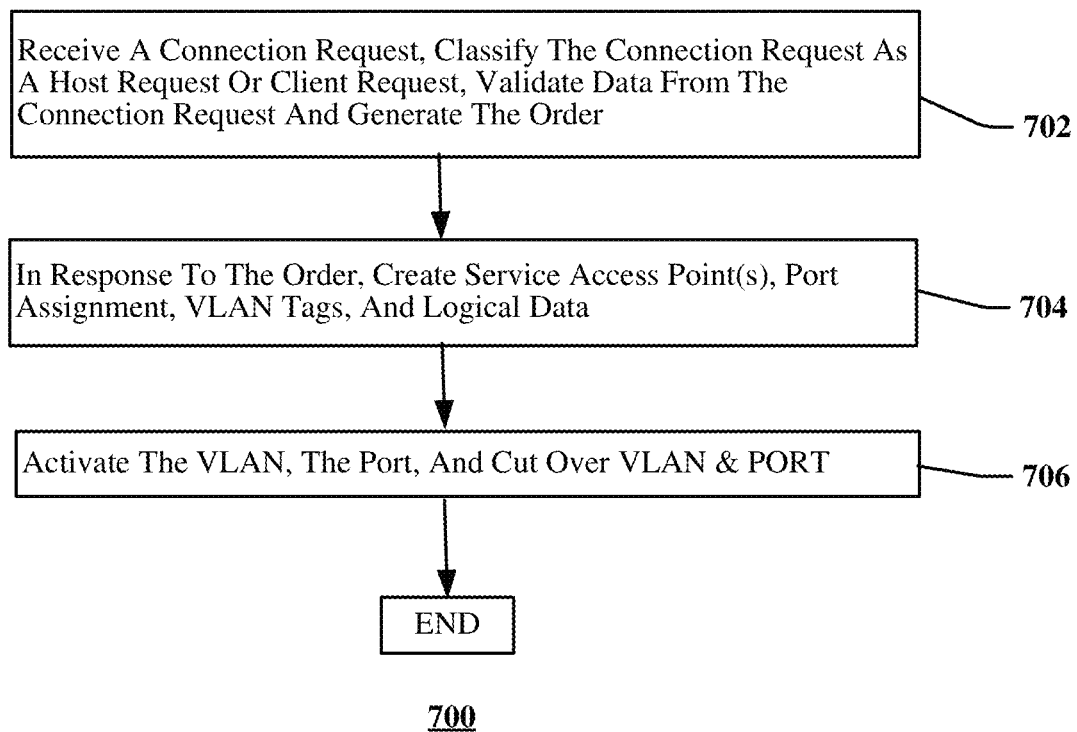
FIG. 7 depicts an illustrative embodiment of a workflow in accordance with various aspects described herein.

FIG. 7 depicts an illustrative embodiment of a workflow 700 in accordance with various aspects described herein. In various embodiments, a connection request is received from one of the subscriber networks and data from the connection request is validated (at 702). Upon validation of the data, an order is generated (at 702). For enhanced user experience, network connection requests or orders that fail to be processed may be auto-canceled so that remnants of an erroneous order do not persist and users can resubmit an updated order.

In response to the order, the workflow engine operates to create service access point(s), create port assignment to be used for connections, create VLAN tags, and create logical data (at 704). In some embodiments, port assignments may be displayed as a default selection for users or subscribers when the connection request is made via the portal 210. Users or subscribers may provide a VLAN identifier. As a next step, the workflow engine operates to activate the VLAN and the port (at 706). Then the workflow engine performs a cut over the VLAN and the port (at 706). Cutover is a stage in the workflow where all the segments that comprise the service enablement are completed and all intermediate states are no longer valid and the end state is made permanent.

In the embodiments described above, the network connection activation/deactivation platform 200 may augment and enhance the existing telecommunication services provided by the service provider and speed-to-market or faster deployment is possible. Users including customers, the service provider, etc. are familiar with the task flow and terminology and need less training. This the network connection activation/deactivation platform 200 allows customers or users to add and remove augmented features without service disruption. Users does not need separate access facilities which has the maximum lead time, particularly if a third party service provider is involved. Users manage the services via the network connection activation/deactivation platform 200 which may be in the form of a self-service portal, on-demand and near real-time activation. Services are provided on a secure network which is managed and monitored continuously for security breach or intrusion.

In the embodiments described above, the network connection activation/deactivation platform 200 eliminates the need for multiple work centers, within the service provider, to intercept customer orders toward fulfillment and provides a near real-time no-touch service enablement.

In the embodiments described above, the network connection activation/deactivation platform 200 classifies the participating subscriber connections as a 'Host' or 'Client' so that inter-company interactions are enabled. That way, services can be exchanged dynamically by configuring inbound/outbound packet filtering and assigning unique host identifiers on the interconnecting VPN/VRF. The network connection activation/deactivation platform 200 also extends the connectivity solutions across telecom model layers and make solutions agnostic to the underlying UNI service. Specifically, the industry is moving towards connectivity to the cloud service providers and the network connection activation/deactivation platform 200 enables the cloud service provider connectivity on the existing customer's access facilities.

While for purposes of simplicity of explanation, the respective processes are shown and described as a series of blocks in FIGS. 5-7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth. As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

One or more of the embodiments described herein can be combined in whole or in part with the embodiments described in co-pending U.S. patent application Ser. No. 18/341,973, entitled "INTRA-ENTERPRISE CONNECTION PLATFORM TO A CLOUD SERVICE USING BORDER GATEWAY PROTOCOL," filed on even date herewith.

What is claimed is:

1. A non-transitory, machine-readable medium, comprising executable instructions that, when executed by a processing system including a processor, facilitate performance of operations, the operations comprising:
   connecting a plurality of subscriber networks of a selected service provider via switched, shared or dedicated Ethernet connections using a wired system provided by the selected service provider operating as a local exchange carrier, wherein the plurality of subscriber networks of the selected service provider includes a first subscriber network and a second subscriber network being different from the first subscriber network, and wherein the first subscriber network and the second subscriber network are separate and distinct networks;
   connecting a first device to a first subscriber network via a virtual local area network (VLAN) using the wired system of the selected service provider that physically reaches a first subscriber premises;
   connecting a second device to a second subscriber network via the VLAN using the wired system of the selected service provider that physically reaches a second subscriber premises;
   upon authorization of a connection request from the first device or the second device and a handshake process to identify the first device and the second device and authenticate the connection request, executing a workflow embedded provisioning and activation application that enables the first device or the second device to selectively activate or deactivate a connection to one or more of the plurality of subscriber networks and a cloud service provider, wherein the provisioning and activation application further enables the first device or the second device to select a plurality of network configuration attributes as an orderable item and wherein the plurality of network configuration attributes are available to and determined by the selected service provider; and
   in response to a first activation request, enabling a connection between the first subscriber network and the second subscriber network that follows the selected plurality of network configuration attributes via a virtual private network (VPN) over a common backbone network of the selected service provider.

2. The non-transitory, machine-readable medium of claim 1, wherein the operations further comprise:
   receiving the first activation request from the first device;
   determining that the first activation request is a host request or a client request;
   based on the determination of the client request, prompting, to the second device, host connection configuration attributes among the plurality of network configuration attributes; and
   enabling the second device to select the host connection configuration attributes and generate a first selection package as the orderable item.

3. The non-transitory, machine-readable medium of claim 2, wherein the host connection configuration attributes comprise:
   a VLAN identifier of the second subscriber network;
   one or more circuits associated with a host port facilitating the connection to the second subscriber network;
   IP data including a customer edge router IP address, a provider edge router address, a subnet mask, a routing protocol or a combination thereof;
   a class of service and type, or a combination thereof.

4. The non-transitory, machine-readable medium of claim 2, wherein the operations further comprising:
   upon receiving the first selection package, initiating the handshake process between the first device and the second device;
   prompting to the first device, client connection configuration attributes among the plurality of network configuration attributes; and
   enabling the first device to select the client connection configuration attributes and generating a second selection package.

5. The non-transitory, machine-readable medium of claim 4, wherein the client connection configuration attributes further comprise a plurality of second network features including:
   a VLAN identifier of the first subscriber network;
   one or more circuits associated with a client port facilitating the connection to the second subscriber network;
   IP data including selection of IPV4 and IPv6, a customer edge router IP address, a provider edge router address, a subnet mask, a routing protocol, or a combination thereof;
   a class of service and type, or a combination thereof.

6. The non-transitory, machine-readable medium of claim 1, wherein the operations further comprise:
   in response to a second activation request, prompting a list of one or more current available cloud service providers by using the workflow embedded provisioning and activation application;
   receiving a selection of a target cloud service provider from the list; and
   enabling a connection to the target cloud service provider that follows the selected plurality of network configuration attributes over the common backbone network of the selected service provider.

7. The non-transitory, machine-readable medium of claim 6, wherein the operations further comprise:
   generating one or more virtual private networks (VPNs) to serve as a hub of interconnection to the target cloud service provider; and
   receiving a selection of a service location to the one or more current available cloud service providers.

8. The non-transitory, machine-readable medium of claim 7, wherein the operations further comprise prompting cloud service configuration attributes among the plurality of network configuration attributes including:
   a VPN to be connected to the target cloud service provider;
   one or more circuits to be connected;
   a bandwidth;

IP data;
a class of service and type;
a provider edge ingress router profile;
an authentication password, or a combination thereof.

9. The non-transitory, machine-readable medium of claim 8, wherein the IP data further comprise a customer edge router IP address, a provider edge router address, and a routing protocol,
  wherein the IP data further includes a selection between IPv4 and IPV6, IPv4 being a default version of the IP data.

10. A device, comprising:
  a processing system including a processor; and
  a memory that stores executable instructions that, when executed by the processing system, facilitate performance of operations, the operations comprising:
    connecting a plurality of subscriber networks of a selected service provider via switched, shared or dedicated Ethernet connections using a wired network provided by the selected service provider operating as a local exchange carrier, wherein the plurality of subscriber networks includes a first network and a second network being different from the first network, and wherein the first network and the second network are separate and distinct networks;
    executing a provisioning and activation application that enables a user to:
      upon authorization of a connection request and a handshake process to identify the first network and the second network and authenticate the connection request, selectively activate or deactivate a connection to one or more of the plurality of subscriber networks and a cloud service provider, as a first orderable item, and
      select a plurality of network configuration attributes, as a second orderable item; and
    based on a request for the connection to the one or more of the plurality of subscriber networks and the cloud service provider using the wired network of the selected service provider that physically reaches the one or more of a plurality of subscriber premises, activating the connection that follows the selected plurality of network configuration attributes and wherein the plurality of network configuration attributes are available to and determined by the selected service provider.

11. The device of claim 10, wherein the executing the provisioning and activation application further comprises providing a portal that enables the user to order an intercompany network connection as the first orderable item and the plurality of network configuration attributes associated with the intercompany network connection as the second orderable item.

12. The device of claim 11, wherein the operations further comprise:
  receiving a first ordered item including the activation or the deactivation of the connection to the one or more of the plurality of subscriber networks or the cloud service provider;
  generating a service access point;
  generating a port assignment;
  generating one or more VLAN tags; and
  activating the assigned port and VLANs.

13. The device of claim 12, wherein the providing the provisioning and activation application further comprises:
  enabling the user to configure one or more attributes of one or more VPNs, wherein the one or more attributes comprise one or more circuits to be connected, a bandwidth, and a service location to the one or more VPNs; and
  generating a VLAN to be connected to a target cloud service provider based on IP data and a routing protocol received as the first and the second orderable items.

14. The device of claim 13, wherein the operations further comprise prompting a link to a portal of the target cloud service provider to the user.

15. The device of claim 12, wherein the selecting the plurality of network configuration attributes further comprises enabling the user to select different bandwidths or change selected bandwidth.

16. A method, comprising:
  connecting, a processing system including a processor, a plurality of subscriber networks of a selected service provider via switched, shared or dedicated Ethernet connections using a wired network provided by the selected service provider operating as a local exchange carrier, wherein the plurality of subscriber networks includes a first network and a second network being different from the first network, and wherein the first network and the second network are separate and distinct networks;
  providing, by the processing system, an on-demand application that enables a user to selectively activate or deactivate a network connection, between the first network and the second network and to a cloud service provider;
  receiving, by the processing system, a request for activating the network connection;
  classifying, by the processing system, the request as a host connection request or a client connection request, where the host connection request provides the same service to multiple clients, and wherein the client connection request provides access to multiple hosts and host sites;
  assigning, by the processing system, a unique host identifier on an interconnecting virtual private network/virtual routing and forwarding (VRF) instance;
  prompting, by the processing system, a plurality of network configuration attributes for selection by the user as an orderable item to the user and wherein the plurality of network configuration attributes are available to and determined by the selected service provider; and
  based on the request for activating the network connection and a handshake process to identify the first network and the second network and authenticate the request for activating the network connection, activating, by the processing system, the connection that follows the selected plurality of network configuration attributes using the wired network of the selected service provider that physically reaches a premises of the first network and the second network.

17. The method of claim 16, further comprising:
  receiving, by the processing system, the request for activating the network connection to the cloud service provider;
  prompting, by the processing system, a list of available cloud service providers among a plurality of cloud service providers;

receiving, by the processing system, a selected target cloud service provider; and prompting to the user, by the processing system, a link to a portal of the selected target cloud service provider.

18. The method of claim 17, further comprising:

generating, by the processing system, one or more virtual private networks (VPNs) to serve as a hub of the network connection to the selected target cloud service provider;

generating a VLAN to be connected to the selected target cloud service provider based on IP data and a routing protocol received as the orderable item; and receiving, by the processing system, the plurality of network configuration attributes relevant to the network connection to the selected target cloud service provider as the orderable item.

19. The method of claim 18, wherein the plurality of network configuration attributes further comprise:

one or more circuits to be connected, a bandwidth, and a service location of the selected target cloud service provider; and IP data including a selection of IPV4 and IPv6, a customer edge router IP address, a provider edge router address, a routing protocol, or a combination thereof;

a class of service and type, or a combination thereof.

20. The method of claim 18, wherein the plurality of network configuration attributes further comprise:

one or more circuits to be configured with packet filtering attributes, wherein the packet filtering attributes are specifically generated and unique and correspond to a community value string of a router configuration as a combination of a VRF instance and the unique host identifier;

wherein the connection is a part of the switched, shared or dedicated Ethernet connections using the wired network and is implemented by a set of nested workflows coordinating orchestration of a design of the one or more circuits and activation thereof, thereby enabling a selected set of sites of the plurality of subscriber networks to be configured for access to the cloud service provider.

* * * * *